(12) United States Patent
Manneschi

(10) Patent No.: US 7,145,328 B2
(45) Date of Patent: Dec. 5, 2006

(54) METAL DETECTOR AND ITS TEST PROCEDURE

(76) Inventor: Alessandro Manneschi, 15, Via XXV Aprile, I-52100 Arezzo (IT)

(*) Notice: Subject to any disclaimer, the term of this patent is extended or adjusted under 35 U.S.C. 154(b) by 180 days.

(21) Appl. No.: 10/645,436

(22) Filed: Aug. 20, 2003

(65) Prior Publication Data

US 2004/0140798 A1 Jul. 22, 2004

(30) Foreign Application Priority Data

Aug. 21, 2002 (IT) .......................... AR2002A0029

(51) Int. Cl.
*G01R 33/12* (2006.01)
*G01N 27/72* (2006.01)
*G08B 13/24* (2006.01)

(52) U.S. Cl. .................. 324/228; 324/202; 340/551
(58) Field of Classification Search ................ 324/326, 324/327, 202, 234, 236, 239, 228, 243, 229; 340/551; 702/116
See application file for complete search history.

(56) References Cited

U.S. PATENT DOCUMENTS

| | | | | |
|---|---|---|---|---|
| 4,672,837 A | * | 6/1987 | Cottrell, Jr. | 324/202 |
| 4,726,434 A | * | 2/1988 | Mosher | 177/25.18 |
| 4,866,424 A | * | 9/1989 | Parks | 340/551 |
| 4,906,973 A | * | 3/1990 | Karbowski et al. | 340/551 |
| 5,039,981 A | * | 8/1991 | Rodriguez | 340/551 |
| 5,397,986 A | * | 3/1995 | Conway et al. | 324/243 |
| 5,406,259 A | * | 4/1995 | Manneschi | 340/561 |
| 5,552,705 A | * | 9/1996 | Keller | 324/239 |
| 5,680,103 A | * | 10/1997 | Turner et al. | 340/551 |
| 5,994,897 A | * | 11/1999 | King | 324/236 |
| 6,150,810 A | * | 11/2000 | Roybal | 324/244 |
| 6,479,993 B1 | * | 11/2002 | Tokutsu | 324/233 |
| 2004/0021461 A1 | * | 2/2004 | Goldfine et al. | 324/243 |

FOREIGN PATENT DOCUMENTS

JP 09072885 A * 3/1997

* cited by examiner

*Primary Examiner*—Michael Cygan
*Assistant Examiner*—Kenneth J. Whittington
(74) *Attorney, Agent, or Firm*—Blakely Sokoloff Taylor & Zafman

(57) ABSTRACT

A test procedure and a metal detector having transmitting coils, receiving coils and an electronic processing circuit adapted to detect variations in the signals received by the receiving coils against a reference value. The metal detector, also includes a test module which has a selector able to detect a test request, and a controller, used when a test request is detected by the selector, able to compare the signals from the receiving coils during the subsequent passing of a known standard reference object with a predetermined response through the detector.

27 Claims, 3 Drawing Sheets

METAL DETECTOR AND ITS TEST PROCEDURE

This invention relates to the metal detector field.

The invention applies in particular to metal detectors for controlling access to sensitive areas, such as, but not limited to, airports, banks, embassies, military installations, etc.

Most metal detecting systems offered in this context have transmitting coils, receiving coils and an electronic processing circuit adapted to detect variations in the signals received by the receiving coils against a reference value.

These detectors generally take the basic form of a security gate or tunnel through which individuals pass, perhaps even the materials being controlled.

Examples of the production of known detectors can be found in documents FR-A-2 720 519, FR-A-2 773 350, FR-A-2 516 251, FR-A-2 610 417, FR-A-2 607 937, FR-A-2 697 919, FR-A-2 698 178 and FR-A-2 698 968, IT 1271382, IT 1216946, IT 1265721, IT 1260208, IT 1249278, IT 1214991 and FN 813502.

Known detectors have provided great service.

However, they do not always give satisfaction.

In particular, it is comparatively difficult to check that these detectors are working properly. In particular, it is generally tricky to check that the detectors are adequately sensitive, due to the diversity of the dangerous objects to be detected nowadays.

In practice, those in charge of the installations are often forced to carry out manual detection and sensitivity tests by manually subjecting various prototypes of objects likely to be detected to the detectors, e.g. knife blades of various shapes and sizes. These operations are tiresome. They require the passing through of numerous prototypes from numerous different directions with regard to the transmitting and receiving coils. Moreover, these operations are of questionable reliability, insofar as there is no general standard procedure established and they therefore cannot guarantee that the detection recorded in the position used in the manual test would be provided in the same way whatever the position of the object in question or for a similar object that is not absolutely identical.

The problems encountered with many known detectors are particularly pronounced for the part of the coils located close to the floor. In fact, many known detectors are sensitive to the environment, e.g. reinforcing metallic masses present in support infrastructures. As a result of this, their calibration is quite difficult. In fact, their response varies depending on the environment and thus the implantation of the detectors. Furthermore, some more effective well-known detectors were studied to distinguish metallic weapons of small size also, even if hidden for example inside shoes with metal-reinforced structures. However, this service can be provided only with the appropriate calibration of the metal detector, depending on the metallic masses present in the floor below the security gate. This manual calibration is complicated because it requires the passing through, in many directions and positions, of sample metallic masses representing the weapons, and a particularly detailed technical knowledge of the characteristics and settings of metal detectors.

The aim of this invention is to offer means to improve the situation.

This aim is achieved in the context of the invention by using a metal detector comprising transmitting and receiving coils and an electronic processing circuit adapted to detect variations in the signals received by the receiving coils against a reference value, characterised in that it also includes a test module which has selection means able to detect a test request, and control means, used when a test request is detected by the selection means, able to compare the signals from the receiving coils during the subsequent passing of a known standard reference object with a predetermined response through the detector.

The said known standard reference object should preferably be a metal sphere, i.e. a body with no preferred orientation.

The invention also relates to a metal detector test process that comprises, after having made a test request, stages that consist of passing a known standard reference object through the detector and comparing the signals from the receiving coils as the object is passed through with a predetermined response.

Other characteristics, aims and advantages of the invention will appear on reading the detailed description to follow and in the light of the attached drawings, given by way of non-exhaustive examples and on which:

Figure 4:
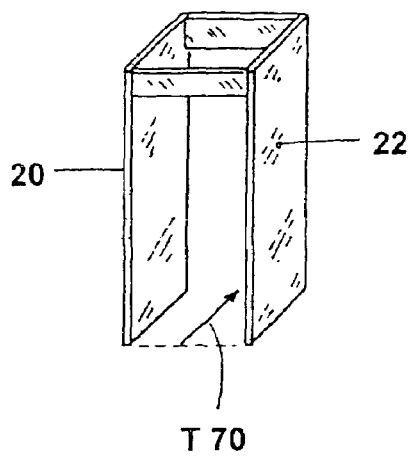
Figure 5:
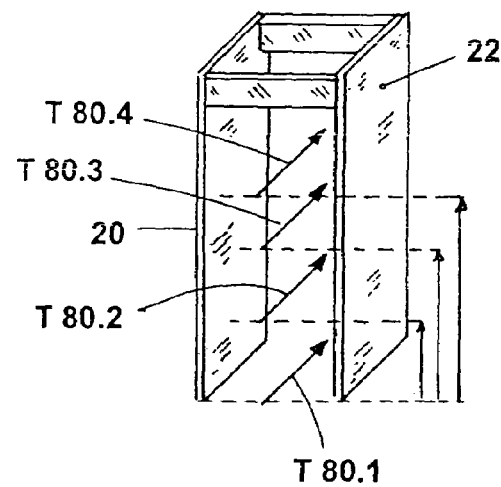
Figure 6:
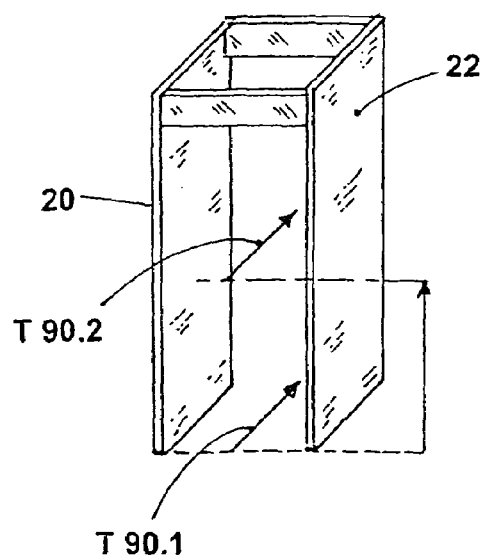
Figure 7:
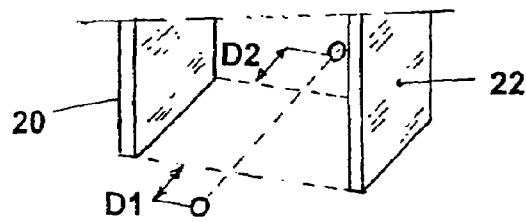

FIGS. 4 to 6 schematically represent the passage of the standard reference object in the context of three variants in accordance with the invention, and FIG. 7 schematically represents the range of the passage of the said standard reference object according to a preferred use of the invention.

Figure 1:
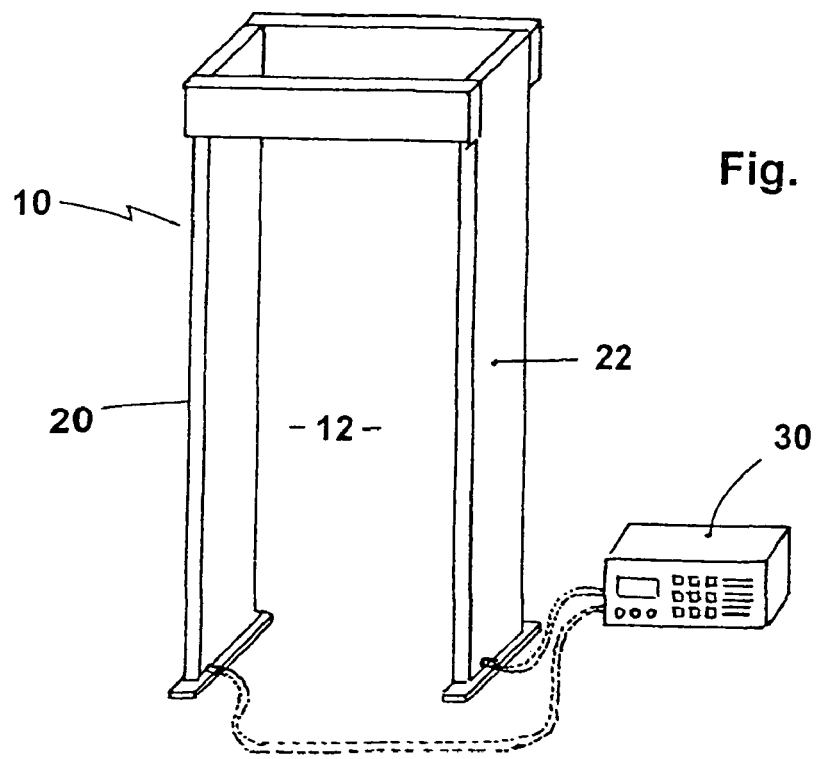
FIG. 1 represents a general schematic view of a standard metal detector, likely to be applied in the context of the present invention.

In the attached FIG. 1, a security gate 10 can be seen, formed essentially from two vertical panels, 20 and 22, which house the transmitting and receiving coils in all configurations known to those skilled in the art. So a channel 12 is defined, between panels 20 and 22, that the individuals to be checked are asked to cross.

The machine also has a processing system 30 designed to apply the power signals needed by the transmitting coils and to process the signals from the receiving coils.

All these means, panels, transmitting and receiving coils, means of power supply and processing are known to those skilled in the art, and therefore need not be described in further detail later. In particular, the present invention must in no way be considered as limited as to the number or configuration of coils, or as to the ways in which the power is provided for the coils and the processing of the signals they give.

Figure 2:
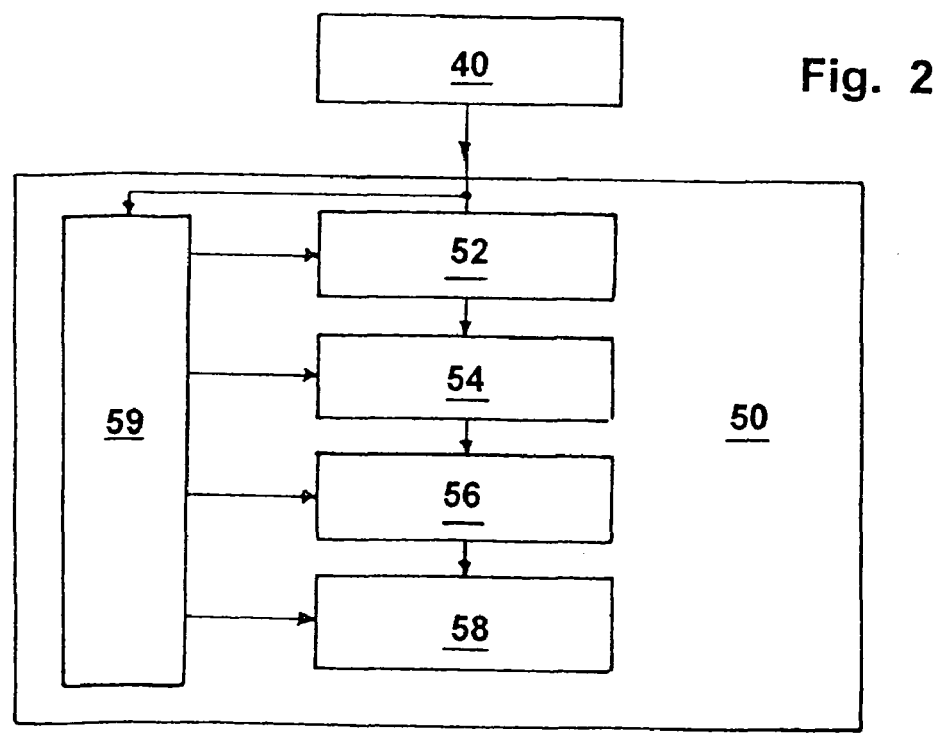
FIG. 2 represents a schematic view of the main functional elements of the test module of a metal detector in accordance with the invention.

FIG. 2 provides a schematic representation of main functional blocks for the parts that make up the test elements of a detector in accordance with the present invention. These parts are preferably housed essentially in the housing for the processing parts 30.

FIG. 2 shows the selection means 40 for detecting a test request, and control means 50.

The selection means 40 for detecting test requests from a user may be the subject of many production variants.

It can be a protected access button, a card reader, a detector of a code entered on a keyboard, or any other equivalent means.

The function of the selection means 40 is to activate the control means 50 when a test request is detected.

In practice, this activation is preferably made by the loading and implementation of a programme specific to the detected request.

In the context of the present invention, preferably several types of test should be offered, and the selection means 40 consequently load a programme selected from several available programmes, depending on the type of request detected.

So three programmes are preferably offered: 1) a procedure for testing and automatically recalibrating the detection parameters if necessary, 2) a full test procedure and 3) a simple, quick test procedure, as will be shown in more detail later.

Preferably, the control means 50 should include a display module 52, a recording module 54, a comparison module 56, an output module 58 and a central processing unit 59 to control the assembly.

The display module 52 is adapted to send signals guiding the operator in the sequencing of the test programme, e.g. by giving signals to proceed with passing the standard reference object through, interrupting this passage, repeating the procedure at a different height, etc.

This would preferably involve a module that sends visual signals. However, as a variant, such a display module with visual signals could be added to or replaced by means giving sound signals.

By way of non-limiting example, the visual signals can take the following form, or any equivalent variant: "WAIT" (to ask the operator to prepare the sphere but to wait), then "PASS 1" (to invite the operator to pass the sphere through), (perhaps followed by "WAIT"—"PASS 2", "WAIT"—"PASS n", etc, should multiple passing-through be required), "OK" (to indicate a positive test result), "FAIL" (to indicate a negative test result), perhaps "NOISE" (if the machine detects a test failure due to the presence of a surrounding interfering noise source, to ask the operator to identify, localise and remove this source of interference).

Where appropriate, the visual signals can show the height at which the standard reference object must be moved. Perhaps if the detector has display means along the height of the detector (e.g. to identify the height at which an unwanted metallic object was detected in the normal operation of the detector), these means could be used for displaying the height at which the operator is asked to move the said standard reference object.

The function of the recording module 54 is to record the signals from the receiving coils during the various successive passages of the standard reference object.

The function of the comparison module 56 is to compare the signals recorded in this way with a predetermined given response.

The function of the output means 58 is to give an output signal representative of the test result. They can thus give a positive signal if the test has been completed without detecting any anomalies. It can give a negative signal if on the other hand the test detected a fault. It could for example be the detection of a source of noise interference disrupting the measurements which should be stopped prior to using the detector.

The output means 58 can also give the output signal by any appropriate means, e.g. visual or sound, or even the printing out of a test report.

In the context of calibration requests, the output means 58 are also adapted to modify the detection parameters if the signals detected from the receiving coils do not fall within a given predetermined response tolerance range. More specifically, the output means 58 can in this case intervene on the supply parameters for the transmitting coils (amplitude, frequency, phase, etc.), or on the detection parameters for signals from the receiving coils, e.g. the amplification factor applied to these signals.

Preferably, the detector gate should have several channels, comprising different coils with different signals for each coil, e.g. dephased signals. In the context of the present invention, the test module is adapted to carry out control operations and even calibration operations if required, for each of the channels.

In the context of the present invention, the standard reference object should preferably be in the form of a metal sphere. This would typically have a diameter of 44.45 mm.

The use of a sphere as a standard reference object has many advantages.

Firstly, a sphere is easy to handle.

Also, and in particular, it provides a necessarily homogeneous response in space, without it being necessary to check its orientation in the space, and consequently it does not risk causing an error from a positioning fault.

Finally and in particular, the Applicant noted, after much research and testing, that a sphere makes it possible, once the full cartography of sensitivity within the gate is known, to completely control the sensitivity of a detector, by simple passing through on a median level, without it being necessary to proceed with very many passages along multiple trajectories (e.g. close to or further from the coils), or even along varied trajectories, as is currently the case.

Figure 3:
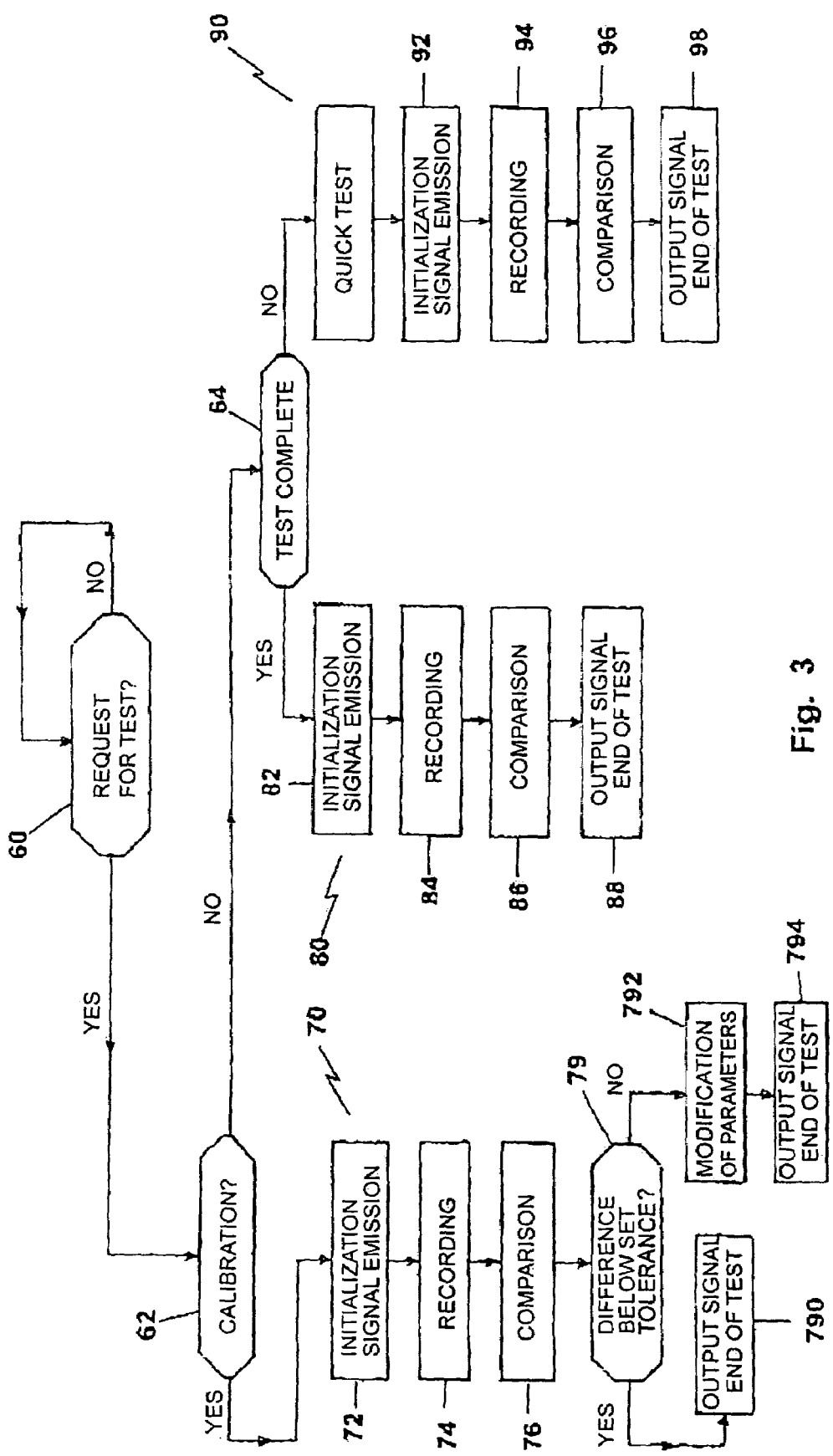
FIG. 3 represents a schematic flow-chart of a test process in accordance with the invention.

The flow-chart illustrated in FIG. 3 will now be described.

It starts with a test request 60 detection stage.

At the time of such detection, the selection means 40 start the test programme corresponding to the type of request detected.

For this the selection means check at stage 62 to see if the procedure asked for is that of calibration.

If so, the test procedure with calibration 70 is started.

On the other hand if the response is negative, the selection means check at stage 64 if the test procedure asked for is a full test or a quick test.

If a full test is asked for, the selection means 40 start the appropriate programme 80. They start the quick test procedure 90 if this is asked for.

Each of these three procedures comprise successive start-up signal transmission stages 72, 82 and 92 inviting the user to initiate a movement of the reference standard object (e.g. "WAIT" then "PASS"), then recording stages 74, 84 and 94 for the signals from the receiving coils at the time of these movements, and comparison stages 76, 86 and 96 consisting of comparing the signals recorded with predetermined given models.

For the full test 80 and quick test 90 procedures, the comparison stages 86 and 96 are followed by a stage 88, 98 of sending an output signal representative of the status of the device detected.

For the calibration procedure 70, the output means 58 are adapted to check at stage 79 if the difference detected between the actual signals from the receiving coils and the predetermined signals serving as a comparison reference fall within a set tolerance range.

If so, the test is positive and the procedure is continued via the stage providing an end-of-test output signal to stage 790.

If on the other hand it is negative, the output means 58 modify the detection parameters for each of the channels, at stage 792, as indicated previously.

This correction may be made, for example, by using stored reference and correction tables, drawn up using the given standard response for each of the channels respectively, at the time a sphere is passed through.

Stage 792 is followed by an end-of-test display stage 794.

Of course each of the three test procedures 70, 80 and 90 may be subject to many variations in practice.

Preferably, the calibration test 70 comprises a single passing through of the reference object, at floor level, as illustrated in FIG. 4 under reference T70; the full test 80 consists preferably of carrying out four successive passes of the reference object, at different heights, for example and without limitation, at floor level, at a height H80.2 of 66 cm, a height H80.3 of 104 cm and a height H80.4 of 142 cm; in FIG. 5 these passes are shown in diagram form in T80.1, T80.2, T80.3 and T80.4; the simple test 90 consists preferably of two successive passes, one at floor level, referenced T90.1 in FIG. 6 and the other about halfway up the gate, reference T90.2 in the same FIG. 6, e.g. at a height H90.2 of 104 cm.

By way of non-limiting example, the test and calibration procedure may be recommended after each installation of a detector, each time a detector component is replaced, or each time a detector's position or set-up is changed, or even every time there is an appreciable change in the environment.

The full test procedure can be recommended under the same conditions as the test and calibration procedure. It can also be recommended periodically for security reasons.

It is the same for the quick test procedure.

The required trajectory for the standard reference object is preferably a rectilinear trajectory, halfway between the gate's two panels 20 and 22, and at a constant height for each respective pass, i.e. horizontal.

Preferably, each trajectory should be started at a distance D1 above the space defined by the detector's panels 20 and 22, e.g. at a distance D1 about 10 cm above this space and the same to end with, respecting the aforementioned rectilinear trajectory, at a distance D2 downstream of this space, e.g. at a distance D2 about 10 cm downstream.

This invention allows for simple testing, by any authorised person, with no special complex training. It also allows for reliable testing. The invention in particular allows for the testing and calibration of the channels or coils active near the floor.

The invention therefore allows for standardising the metal detector's detection response to the various installation conditions of the metal detector.

This invention allows for having reliable, sensitive and standard security-gate metal detectors.

Of course, the invention is not limited to the particular execution methods just described, but extends to any variant according to their intended use.

In particular, the invention is not limited as to the number or height of passes made by the standard reference object as mentioned above. In practice, these numbers and heights for passes will be adapted by those skilled in the art to stimulate all the channels of the tested detectors according to their particular configuration.

Nor is the invention limited to use as a security gate detector as illustrated in FIG. 1. It applies to all configurations of detectors, including for example, column detectors, i.e. detectors in which all the coils, whether transmitting or receiving, are grouped together in a shared central support, e.g. a vertical cylindrical column.

The invention claimed is:

1. Metal detector comprising transmitting coils, receiving coils and an electronic processing circuit (30) adapted to detect variations in signals received by the receiving coils in relation to a reference value, characterised in that it also includes a test module comprising selection means (40) for detecting a test request, and control means (50), used when a test request by the selection means (40) is detected, for comparing the signals from the receiving coils, at the time of subsequent passing of a standard reference object through the detector, with a predetermined response, wherein the control means (50) comprise a display module (52), a recording module (54), a comparison module (56), an output module (58) and a central processing unit (59) which controls the assembly, and the display module (52) is adapted to give signals indicating the height at which the standard reference object must be moved.

2. Detector according to claim 1 characterised in that the standard reference object is a metal sphere.

3. Detector according to claim 1, characterised in that the test module is adapted to carry out control operations for each of the detector's channels.

4. Detector according to claim 1, characterised in that the selection means (40) are selected in the group comprising: a protected access button, a card reader, a detector of a code entered on a keyboard.

5. Detector according to claim 1, characterised in that the selection means (40) are adapted to load and use a control programme specific to the request detected.

6. Detector according to claim 1, characterised in that the selection means (40) are adapted to load and use a control programme specific to the request detected, selected from several available control programmes.

7. Detector according to claim 1, characterised in that the selection means (40) are adapted to load and use a control programme specific to the request detected, selected from 3 available control programmes: 1) an automatic test and recalibration procedure for the detection parameters if necessary, 2) a full test procedure and 3) a simple and quick test procedure.

8. Detector according to claim 7 characterised in that the display module (52) is adapted to send signals guiding the operator in the sequencing of the test programme.

9. Detector according to claim 7, characterised in that the display module (52) is adapted to give signals to proceed with passing the standard reference object through, interrupting this passing, and repeating the procedure at a different height.

10. Detector according to claim 7, characterised in that the output means (58) provide an output signal representative of the test result.

11. Detector according to claim 7, characterised in that the output means (58) are adapted to modify the detection parameters if the signals detected from the receiving coils do not fall within a given predetermined response tolerance range in the context of a calibration request.

12. Detector according to claim 11 characterised in that the test module is adapted to carry out calibration operations for each of the detector's channels.

13. Test procedure for metal detectors characterised in that it includes, after a stage (60) of sending a test request, stages comprising passing a known standard reference object through the detector (72, 82, 92), comparing (76, 86, 96) the signals from the receiving coils at the time of this passing, with a predetermined response, and sending signals (72, 82, 92) indicating the height at which the standard reference object must be moved.

14. Procedure according to claim 13 characterised in that the standard reference object is a metal sphere.

15. Procedure according to claim 13, characterised in that the test request sending stage (60) comprises the selection from several available programmes.

16. Procedure according to claim 13, characterised in that the test request sending stage (60) comprises the selection from three available programmes: 1) an automatic test and recalibration procedure for the detection parameters if necessary, 2) a full test procedure and 3) a simple and quick test procedure.

17. Procedure according to claim 13, characterised in that it comprises sending signals (72,82, 92) guiding the operator in the sequencing of the test programme.

18. Procedure according to claim 13, characterised in that it comprises a stage (792) modifying the detection parameters if the signals detected from the receiving coils do not fall within a given predetermined response tolerance range.

19. Procedure according to claim 18, characterised in that the modification stage (792) includes modifying the amplification factor of the signals from the receiving coils.

20. Procedure according to claim 13, characterised in that it includes a calibration procedure (70) comprising a single passing through of the reference object, at floor level.

21. Procedure according to claim 13, characterised in that it includes a test procedure (80, 90) including carrying out several successive passes of the reference object, at different heights.

22. Procedure according to claim 21, characterised in that a test procedure (80) comprises four successive passes of the reference object, at different heights.

23. Procedure according to claim 21, characterised in that a test procedure (90) comprises two successive passes of the reference object, at different heights.

24. Procedure according to claim 13, characterised in that the trajectory of the standard reference object is a rectilinear trajectory (T) and at a constant height for each respective pass.

25. Procedure according to claim 13, characterised in that the trajectory of the standard reference object is effected halfway between two panels (20, 22) making up the detector.

26. Metal detector comprising transmitting coils, receiving coils and an electronic processing circuit (30) adapted to detect variations in signals received by the receiving coils in relation to a reference value, characterized in that it also includes a test module comprising selection means (40) for detecting a test request, and control means (50), used when a test request by the selection means (40) is detected, for comparing the signals from the receiving coils, at the time of subsequent passing of a standard reference object through the detector, with a predetermined response, wherein the control means (50) comprise a display module (52), a recording module (54), a comparison module (56), an output module (58) and a central processing unit (59) which controls the assembly, wherein the output module (58) is adapted to modify the detection parameters if the signals detected from the receiving coils do not fall within a given predetermined response tolerance range in the context of a calibration request.

27. Detector according to claim 26 characterised in that the test module is adapted to carry out calibration operations for each of the detector's channels.

* * * * *